United States Patent
Zhang et al.

(10) Patent No.: US 10,909,172 B2
(45) Date of Patent: *Feb. 2, 2021

(54) ADAPTIVE RECOMMENDATIONS OF USER-GENERATED MEDIASETS

(71) Applicant: Google LLC, Mountain View, CA (US)

(72) Inventors: Kun Zhang, Mountain View, CA (US); Yu He, Sunnyvale, CA (US); Cristos Jon Goodrow, Burlingame, CA (US)

(73) Assignee: Google LLC, Mountain View, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/599,868

(22) Filed: May 19, 2017

(65) Prior Publication Data

US 2017/0255698 A1   Sep. 7, 2017

Related U.S. Application Data

(63) Continuation of application No. 13/437,230, filed on Apr. 2, 2012, now Pat. No. 9,659,093.

(51) Int. Cl.
*G06F 16/00* (2019.01)
*G06F 16/638* (2019.01)
*G06F 16/438* (2019.01)
*G06F 16/30* (2019.01)

(52) U.S. Cl.
CPC ........ *G06F 16/639* (2019.01); *G06F 16/4387* (2019.01)

(58) Field of Classification Search
None
See application file for complete search history.

(56) References Cited

U.S. PATENT DOCUMENTS

| | | | |
|---|---|---|---|
| 6,526,411 B1* | 2/2003 | Ward | G06F 16/7867 |
| 6,941,324 B2 | 9/2005 | Plastina et al. | |
| 7,765,158 B2* | 7/2010 | Sugimoto | H04N 5/85 705/51 |
| 7,853,600 B2 | 12/2010 | Herz et al. | |
| 7,962,505 B2 | 6/2011 | Torrens et al. | |

(Continued)

OTHER PUBLICATIONS

Notice of Allowance dated Jan. 23, 2017 in U.S. Appl. No. 13/437,230.

(Continued)

*Primary Examiner* — Polina G Peach
(74) *Attorney, Agent, or Firm* — Byrne Poh LLP

(57) ABSTRACT

This disclosure relates to adaptive recommendations for user-generated mediasets. A mediaset component provides for users to generate mediasets. A user-generated mediaset can include a user-generated playlist or a user-generated media channel. A monitoring component monitors consumption of media, e.g., by a consumer. A relatedness component determines a set of the user-generated mediasets that are related to the media consumed by the consumer. A recommendation component recommends a subset of the user-generated mediasets based on a set of criteria. A rights management component determines a set of authorizations of the consumer for respective media content associated with the set of user-generated mediasets, and takes at least one action based on the set of authorizations, e.g., updating one of the mediasets based on the set of authorizations.

12 Claims, 11 Drawing Sheets

(56) References Cited

U.S. PATENT DOCUMENTS

| | | | |
|---|---|---|---|
| 7,985,911 B2 | 7/2011 | Oppenheimer | |
| 8,224,856 B2 | 7/2012 | Purdy | |
| 8,260,656 B1* | 9/2012 | Harbick | G06Q 30/02 |
| | | | 705/7.31 |
| 8,332,425 B2 | 12/2012 | Svendsen et al. | |
| 8,560,950 B2* | 10/2013 | Bull | G06F 16/68 |
| | | | 715/716 |
| 8,601,003 B2* | 12/2013 | Gates | G06F 16/9535 |
| | | | 707/749 |
| 8,774,951 B2* | 7/2014 | Lee | G06F 16/48 |
| | | | 700/94 |
| 8,843,463 B2 | 9/2014 | Moritz et al. | |
| 2003/0221541 A1 | 12/2003 | Platt | |
| 2003/0233460 A1 | 12/2003 | Drucker et al. | |
| 2005/0038819 A1* | 2/2005 | Hicken | G06F 17/30743 |
| 2005/0050079 A1 | 3/2005 | Plastina et al. | |
| 2006/0074902 A1 | 4/2006 | Anderson et al. | |
| 2006/0143236 A1 | 6/2006 | Wu | |
| 2006/0173910 A1 | 8/2006 | McLaughlin | |
| 2006/0195516 A1 | 8/2006 | Beaupre | |
| 2006/0212444 A1 | 9/2006 | Handman et al. | |
| 2006/0265421 A1* | 11/2006 | Ranasinghe | G06F 17/30743 |
| 2007/0038931 A1 | 2/2007 | Allaire et al. | |
| 2007/0244880 A1* | 10/2007 | Martin | G06Q 30/02 |
| 2008/0052630 A1 | 2/2008 | Rosenbaum et al. | |
| 2008/0115173 A1* | 5/2008 | Ellis | H04N 21/4828 |
| | | | 725/61 |
| 2008/0120501 A1 | 5/2008 | Jannink et al. | |
| 2008/0147711 A1 | 6/2008 | Spiegelman et al. | |
| 2008/0208379 A1 | 8/2008 | Weel | |
| 2009/0025054 A1 | 1/2009 | Gibbs et al. | |
| 2009/0055426 A1 | 2/2009 | Kalasapur et al. | |
| 2009/0083260 A1* | 3/2009 | Artom | G06Q 30/0264 |
| 2009/0210415 A1 | 8/2009 | Martin et al. | |
| 2010/0076983 A1 | 3/2010 | Gates et al. | |
| 2010/0088327 A1* | 4/2010 | Holm | G06F 16/4387 |
| | | | 707/758 |
| 2010/0198767 A1 | 8/2010 | Farrelly | |
| 2010/0318919 A1 | 12/2010 | Murphy et al. | |
| 2011/0214147 A1 | 9/2011 | Kashyap et al. | |
| 2011/0270703 A1 | 11/2011 | Engle | |
| 2011/0289075 A1* | 11/2011 | Nelson | G06F 17/30772 |
| | | | 707/723 |
| 2012/0059825 A1* | 3/2012 | Fishman | G06F 17/30053 |
| | | | 707/737 |
| 2012/0173383 A1 | 7/2012 | Badawiyeh et al. | |
| 2012/0179693 A1 | 7/2012 | Knight et al. | |
| 2012/0226536 A1 | 9/2012 | Kidron | |
| 2012/0331494 A1 | 12/2012 | Pontual et al. | |

OTHER PUBLICATIONS

Office Action dated Apr. 5, 2013 in U.S. Appl. No. 13/437,230.
Office Action dated Jun. 4, 2014 in U.S. Appl. No. 13/437,230.
Office Action dated Jul. 15, 2013 in U.S. Appl. No. 13/437,230.
Office Action dated Jul. 16, 2012 in U.S. Appl. No. 13/437,230.
Office Action dated Jul. 31, 2015 in U.S. Appl. No. 13/437,230.
Office Action dated Oct. 9, 2014 in U.S. Appl. No. 13/437,230.
Office Action dated Oct. 24, 2012 in U.S. Appl. No. 13/437,230.
Office Action dated Oct. 28, 2015 in U.S. Appl. No. 13/437,230.
Office Action dated Sep. 9, 2016 in U.S. Appl. No. 13/437,230.
Walter, S. F., "Clustering by Affinity Propagation" May-Aug. 2007, Department of Physics, ETH Zurich.

* cited by examiner

ADAPTIVE RECOMMENDATIONS OF USER-GENERATED MEDIASETS

CROSS-REFERENCE TO RELATED APPLICATION

This application is a continuation of U.S. patent application Ser. No. 13/437,230, filed Apr. 2, 2012, which is hereby incorporated by reference herein in its entirety.

TECHNICAL FIELD

This disclosure generally relates to systems and methods that facilitate adaptively recommending user-generated mediasets.

BACKGROUND

The internet and media enabled portable computing devices have dramatically altered the processes for generating and consuming media content. Presently, users can consume media content virtually anywhere at any time, as long as they have access to a media capable device with an internet connection. The convenience of being able to view media content via the internet, essentially on demand, has resulted in explosive growth of internet media consumption. Internet media traffic is currently approaching a majority of consumer internet traffic, and the rate of demand is projected to continue increasing.

The sheer quantity of media content available to users can make selecting content for consumption challenging. Millions of people around the world have the capability to produce media content, and popular online services can receive tens of hours worth of newly uploaded user-generated content every minute. In addition, traditional media outlets now have the ability to enable consumers to access archives containing large amounts of older media content, along with newly generated content. Users may overlook available content well suited to their individual preferences because of an inability to locate or identify the content.

A technique that been commonly employed to assist users in indentifying media content for consumption includes recommending media content that shares attributes with other media content. Additionally, content is often organized into categories based on one or more attributes. However, due to the large quantity of media content available, recommending and/or organizing content based on attributes may provide limited information regarding desirability of the media content to the user. Additionally, due to the large quantities of media content available, reviewing and refining recommendations based on attributes can be a tedious and time consuming process.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

According to an aspect of the subject innovation, systems and methods for adaptive recommendations of user-generated mediasets are disclosed. A mediaset component provides for users to generate mediasets. A monitoring component monitors consumption of media, e.g., by a consumer/user as permitted by the consumer/user. A relatedness component determines a set of the user-generated mediasets that are related to the media consumed. The set of user-generated mediasets can include at least one of a user-generated playlist or a user-generated media channel. A recommendation component recommends a subset of the user-generated mediasets based at least in part on a set of criteria. In an embodiment, a rights management component determines a set of authorizations of the consumer for respective media content associated with the set of user-generated mediasets, and takes at least one action based on the set of authorizations, e.g., updating one of the mediasets based on the set of authorizations.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
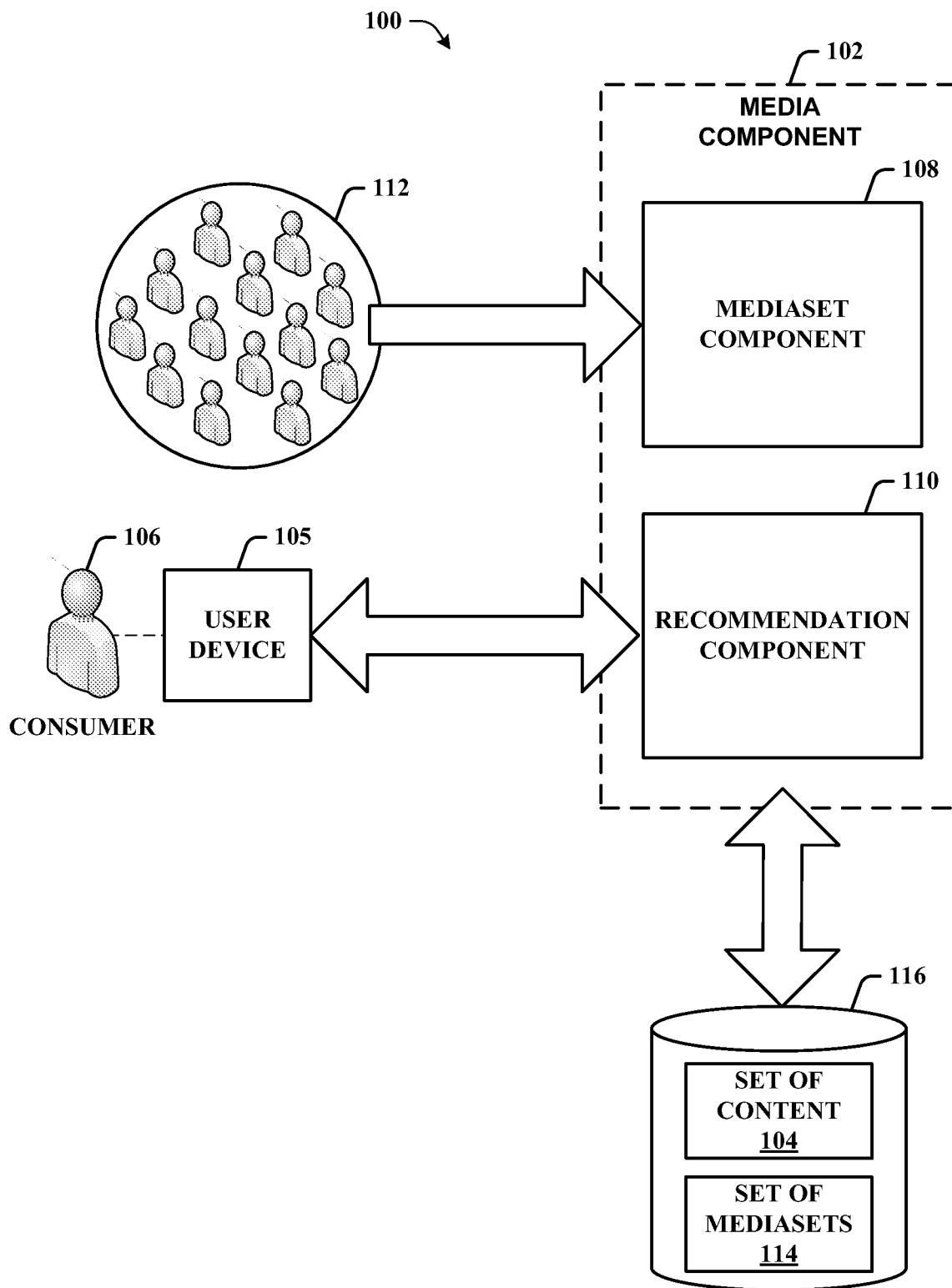
FIG. 1 illustrates an example system for adaptive recommendations of user-generated mediasets in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Techniques that identify media content for consumption based on shared attributes with other media content, or organize content into categories based on attributes can be ineffective due to the large quantity of media content available. Additionally, reviewing and refining recommendations of individual content based on attributes can be a tedious and time consuming process.

One non-limiting implementation of the innovation provides for adaptive recommendations of user-generated mediasets. Users can generate mediasets that associate media content based on user preference. The implementation adaptively recommends user-generated mediasets to other users based on relatedness of media content consumed by the other users and the user-generated mediasets.

More particularly, in accordance with an embodiment, a monitoring component monitors consumption of media by a user as permitted by the user, a relatedness component determines a set of user-generated mediasets related to the media consumed by the user, and a recommendations component recommends a subset of the user-generated mediasets based at least in part on a set of criteria.

Non-Limiting Examples of Systems for Adaptive Recommendations of User-Generated Mediasets Turning now to FIG. 1, illustrated is an example system 100 for adaptive recommendations of user-generated mediasets in accordance with various aspects described in this disclosure. Generally, system 100 can include a memory that stores computer executable components and a processor that executes computer executable components stored in the memory, examples of which can be found with reference to FIG. 11. System 100 includes a media component 102. The media component 102 streams, transmits, or otherwise provides media content and/or mediasets to a content consumer 106 (which also may be referred to herein as user 106). For example, in one implementation, the media component 102 provides content included in a set of content 104 to a user device 105 associated with the consumer 106 via a network connection. The content includes but is not limited to videos, music, electronic books (e-books), video games, websites, and/or articles. The user device 105 can include but is not limited to a smart phone, a cell phone, a personal digital assistant (PDA), a tablet, a laptop, a desktop, a portable music player, a video game system, an electronic reader (e-reader), global positioning system (GPS), a set-top box, and/or a television. The media component 102 includes a mediaset component 108, and a recommendation component 110. It is to be appreciated that although the media component 102 is illustrated as being a stand-alone component, such implementation is not so limited. For example, the media component 102 can be included in a content server, a user device (e.g., user device 105), a multimedia player, and so forth.

The mediaset component 108 provides for a user in a set of users 112 to determine, create, or otherwise generate a user-generated mediaset. The user-generated mediaset includes but is not limited to a user-generated playlist, and/or a user-generated media channel. For example, in one implementation, a user can select, choose, or otherwise determine a subset of the content 104 to associate with a user-generated playlist, and a set of playlist options for the user-generated playlist. The playlist options can include but are not limited to an order (e.g., rank, sequence, etc.) of the respective content associated with the user-generated playlist, a set of privacy options for the user-generated playlist (e.g., public, private, only-friends, etc.), and/or a set of tags (e.g., metadata, notes, ratings, reviews, etc.) associated with the user-generated playlist. For instance, a user can generate a friends-only playlist, associate a set of videos included in the set of content 104 with the playlist, and set a sequence for consuming the set of videos (e.g., a play order).

The recommendation component 110 provides, suggests, or otherwise recommends one or more user-generated mediasets to the consumer 106. For example, in an implementation, the recommendation component 110 recommends user-generated mediasets to the consumer 106 based on media consumption by the consumer 106, as permitted by the consumer. Consumption can include but is not limited to viewing, searching, downloading, sharing (e.g., posting on a social networking site, blogging, or linking to or embedding in a website), rating, and/or reviewing content or mediasets. In addition, the recommendation component 110 provides the consumer 106 a set of options. The options can include but are not limited to saving (e.g., add to favorites) a mediaset, consuming a mediaset, sharing a mediaset, and/or modifying a mediaset. It is to be appreciated that although the set of media content 104 and set of mediasets 114 are illustrated as being maintained in a data store 116, such implementation is not so limited. For example, the set of media content 104 and/or set of mediasets 114 can be included in the same component or device or in different components or devices. The set of media content 104 and/or set of mediasets 114 can be included in the media component 102, the user device 105, and/or in another location, wherein the media component 102 may access the set of media content 104 and/or set of mediasets 114, e.g., via a network connection.

Figure 2:
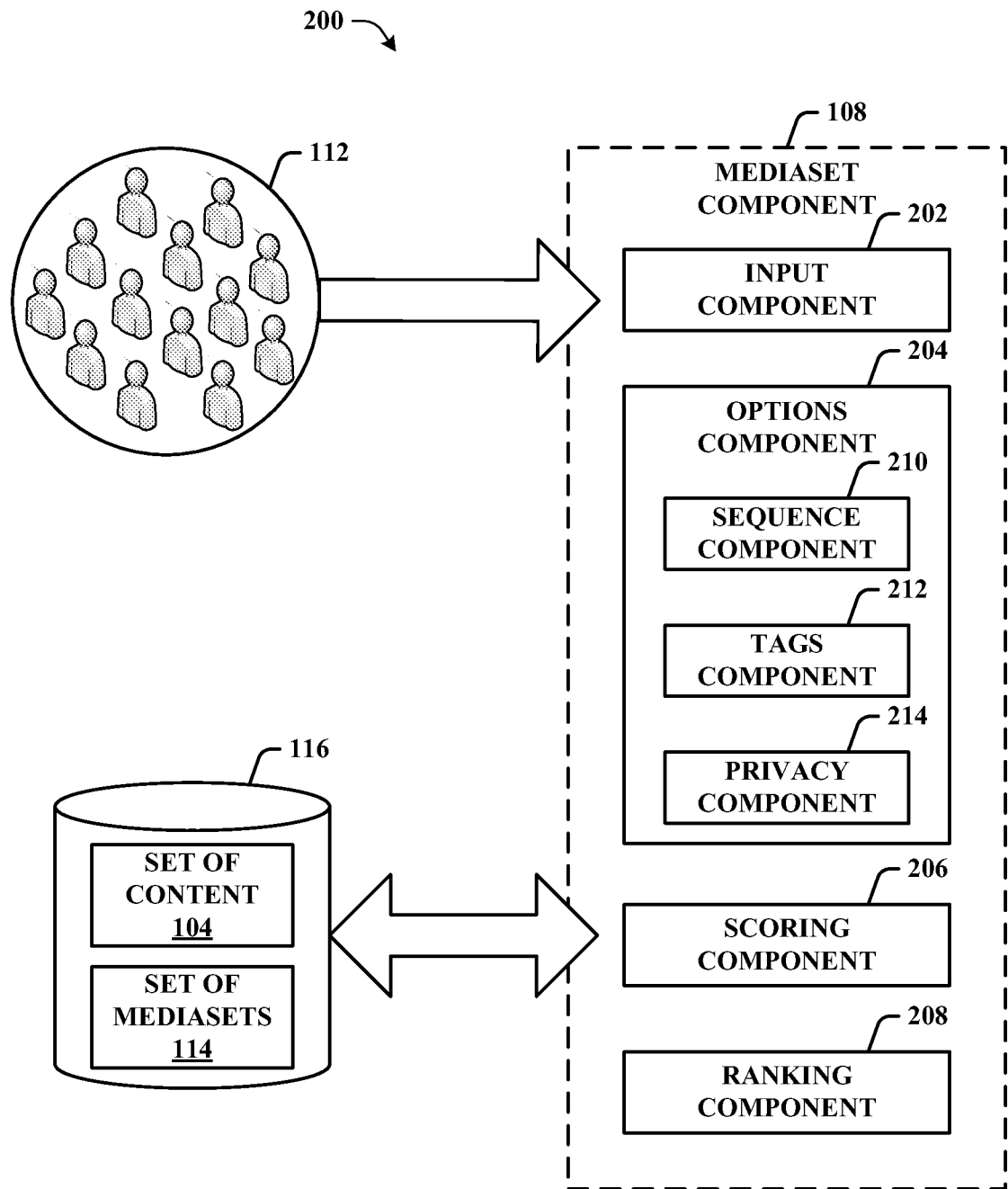
FIG. 2 illustrates an example mediaset component in accordance with various aspects described in this disclosure.

FIG. 2 illustrates an example mediaset component 108 in accordance with various aspects described in this disclosure. As discussed, the mediaset component 108 provides for one or more users in a set of users 112 to generate a mediaset (e.g., user-generated mediaset, user-generated playlist, user-generated channel, etc.). For example, in one implementation, a user determines content (e.g., a subset of the content 104) to associate with a user-generated mediaset, and a set of options relating to the user-generated mediaset. The mediaset component 108 in FIG. 2 includes an input component 202, an options component 204, a scoring component 206, and a ranking component 208.

The input component 202 acquires, obtains, or otherwise receives input from a user in the set of users 112 related to generating a mediaset. The input can include explicit user inputs (e.g., configuration selections, question/answer, etc.) such as from mouse selections, keyboard selections, and/or speech. Additionally or alternatively, the input can include data uploads, wherein a data upload is a transfer of data from the user or an associated third party source (e.g. computer or a computer readable medium), to the input component 202. The data uploads can include but are not limited to user-generated mediasets and/or data relating to the generation of a mediaset. For example, in one implementation, the input component 202 can receive a user-generated mediaset from a user device via a network connection.

The options component 204 provides for the user to generate, set, or otherwise determine one or more options for user-generated mediasets. The options component 204 includes a sequence component 210, a tags component 212, and a privacy component 214. The sequence component 210 provides for the user to set an order, ranking, or sequence of playback for content associated with a user-generated mediaset. For example, in one implementation, the sequence directs an order in which the media component 102 provides content included in the user-generated mediaset to a consumer 106. The tags component 212 provides for a user to append one or more tags (e.g., comments, notes, metadata, ratings, reviews, etc.) to the user-generated mediaset, or respective content included in the user-generated mediaset. For example, the user may append a tag to the user-generated mediaset explaining a theme, and append tags to respective content associated with the user-generated mediaset that detail facts and/or opinions regarding the content. The privacy component 214 provides for the user to set, select, or otherwise determine a set of privacy options for the user-generated mediaset. The privacy options can include but are not limited private, public, and/or available to a set of designated users. For example, in one implementation, the user may explicitly determine a set of other users that can access the user-generated mediaset (e.g., available to designated users).

The scoring component 206 scores (e.g., grades, classifies, etc.) respective user-generated mediasets in the set of mediasets 114 as a function of a set of consumption factors. The consumption factors can include but are not limited to user ratings, a quantity or percentage of users that save or add a user-generated mediaset to their favorites, a quantity or percentage of users that share (e.g., post, status, blog, etc.) a user-generated mediaset, a category or classification of a user-generated mediaset, and/or a quantity or percentage of users that consume the user-generated mediaset. The ranking component 208 ranks respective user-generated mediasets in the set of mediasets 114 as a function of the score (score ranking). For example, in one implementation, the media component 102 provides a subset of the mediasets 114 to the consumer 106 in an ordered list based at least in part on their respective rankings. The rankings can assist the consumer 106 in determining mediasets that are popular among other users.

Figure 3:
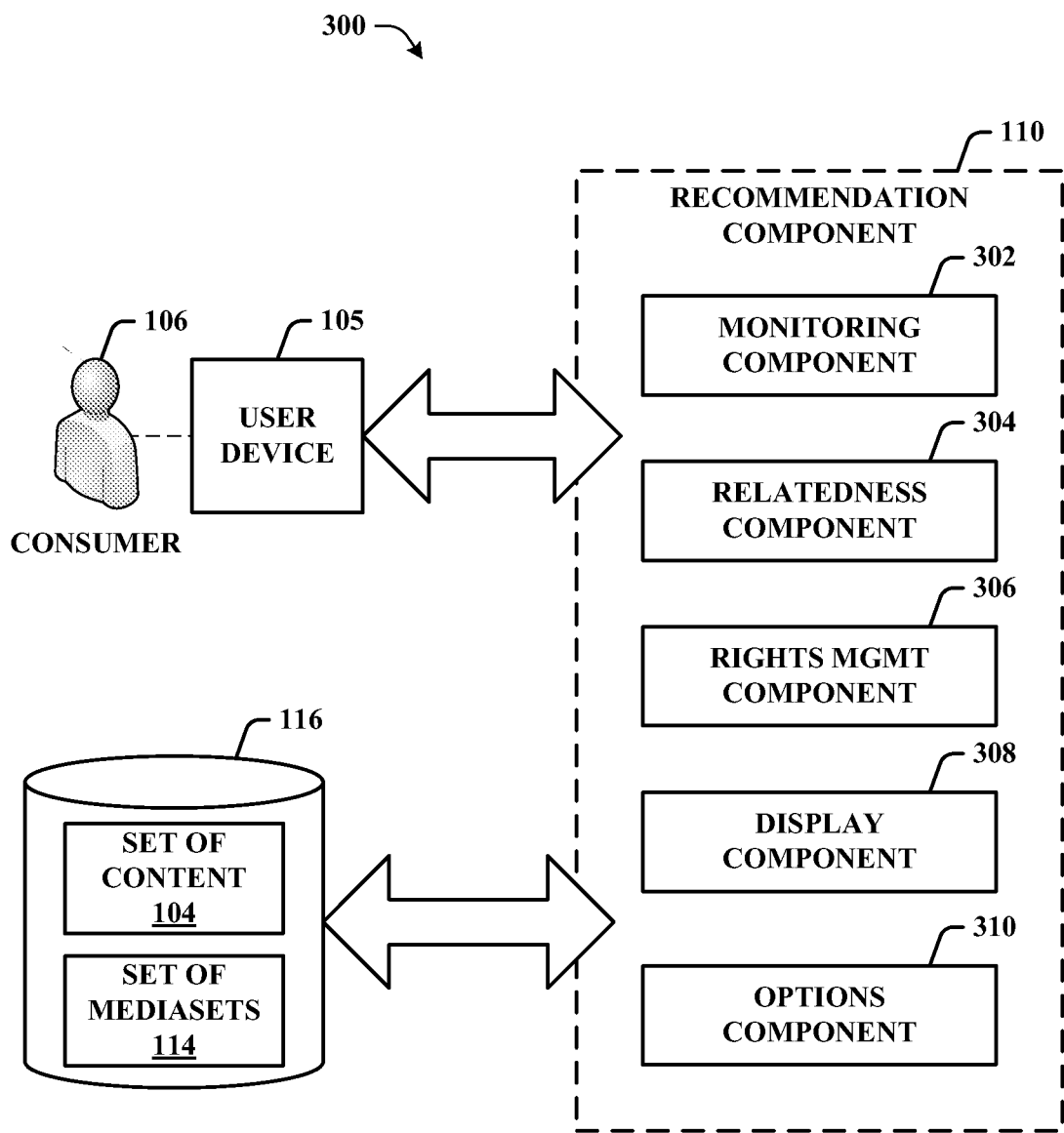
FIG. 3 illustrates an example recommendation component in accordance with various aspects described in this disclosure.

FIG. 3 illustrates an example recommendation component 110 in accordance with various aspects described in this disclosure. As discussed, the recommendation component 110 recommends a subset of the user-generated mediasets 114 to a consumer 106, and provides the consumer 106 a set of options regarding the recommended user-generated mediasets. The recommendation component 110 in FIG. 3 includes a monitoring component 302, a relatedness component 304, a rights management component 306, a display component 308, and an options component 310.

The monitoring component 302 recognizes, examines, or otherwise monitors consumption of media by the consumer 106 as permitted by the consumer. Consumption can include but is not limited to viewing, searching, downloading, sharing, rating, and/or reviewing media content or mediasets. In one implementation, the monitoring component 302 notifies the consumer 106 of the types of information that are stored, transmitted, and/or monitored, and provides for the consumer 106 to opt-out of having such information collected and/or shared with the media component 102.

The relatedness component 304 determines a subset of the user-generated mediasets 114 that are related to a consumed media. The relatedness criteria can include but is not limited to satisfying a predetermined relatedness threshold, and/or satisfying a predetermined relatedness ranking threshold (e.g., top 5, top 10, etc.). For example, in one implementation, the relatedness component 304 determines a subset of the user-generated mediasets 114 that are related to a consumed media content as a function of the relatedness of the consumed media content and respective content associated with the subset of the user-generated mediasets 114. As an additional or alternative example, in one implementation, the relatedness component 304 determines a subset of the user-generated mediasets 114 that are related to a consumed mediaset as a function of the relatedness of the consumed mediaset and respective content associated with the subset of the user-generated mediasets 114. For instance, the relatedness component 304 can determine the relatedness of a user-generated mediaset (S) included in the set of user-generated mediasets 114 and consumed media content (V) as a function (e.g., summing, averaging, etc.) of the relatedness of respective content ($SV1, SV2, \ldots, SVx$) associated with the user-generated mediaset (S) and the consumed media content (V) (e.g., Relatedness (V, S)=Sum(Relatedness(V, SV1)+Relatedness(V, SV2), + . . . +Relatedness(V, SVx), where X is an integer).

Additionally or alternatively, the relatedness component 304 can determine the relatedness of a first user-generated mediaset (S1) included in the set of user-generated mediasets 114 and a consumed mediaset (S2) as a function (e.g., summing, averaging, etc.) of the relatedness of respective content included in the first mediaset ($S1V1, S1V2, \ldots, S1Vx$, where X is an integer) and respective content ($S2V1, S2V2, \ldots, S2Vy$, where Y is an integer) included in the consumed mediaset. As an additional or alternative example, in one implementation, the relatedness component 304 can determine the relatedness of the first mediaset (S1) and the consumed mediaset (S2) as a function of user behavior between the first mediaset and consumed mediaset. User behavior between the mediasets can include but is not limited to viewing, searching, downloading, sharing, rating, and/or reviewing content. For instance, the relatedness component 304 can determine the relatedness of the first user-generated mediaset (S1) and the consumed mediaset (S2) as a function of attributes or user ratings provided for respective content common to both the first mediaset (S1) and the consumed mediaset (S2).

The rights management component 306 determines whether the consumer 106 has authorization to consume respective media content associated with a mediaset. For example, in one implementation, the consumer 106 can locally consume media content maintained on the user device 105. The rights management component 306 determines a set of privileges or authorizations (e.g., licenses, subscriptions, etc.) for respective media content maintained on the user device 105 associated with a user-generated mediaset, and based on the authorizations determines whether the consumer 106 has authorization to consume media content included in the set of media content. The rights management component 306 takes a set of actions based on the authorizations of the consumer 106. The set of actions can include but is not limited to not recommending a mediaset to the consumer 106, restricting access to mediasets, modifying a mediaset based on the consumer's 106 authorization, and/or notifying the consumer 106.

The display component 308 presents, generates, or otherwise provides a display of a subset of the mediasets 114 (or data associated with the mediasets) to the user device 105. Aspects of the invention are not limited to a particular display of the subset of the mediasets 114, and can include a media channel, a list, a leaderboard, a chart, a graph, and/or a map. The subset of the mediasets 114 includes respective mediasets in the set of mediasets 114 satisfying a set of display criteria. The display criteria can include but is not limited to satisfying a relatedness threshold, satisfying a relatedness ranking threshold, satisfying a score threshold, satisfying a score ranking threshold, and/or the consumer 106 having authorization to consume respective media content associated with the mediaset. For example, in one implementation, the display component 308 presents an ordered list that includes a predetermined quantity of mediasets having a set of respective relatedness rankings greater than other mediasets (e.g., Top 10, Top 25, etc.).

The options component 310 provides options for the consumer 106 to consume one or more mediasets presented in the display. For example, in one implementation, the consumer 106 can save a mediaset, play a mediaset, share a mediaset, modify a mediaset, purchase content associated with a mediaset, and/or download a mediaset to the user device 105. For instance, the consumer 106 can play or view a mediaset (e.g., playlist) including a set of videos by selecting (e.g., clicking, touching, etc.) a link associated with the mediasets via the display.

Figure 4:
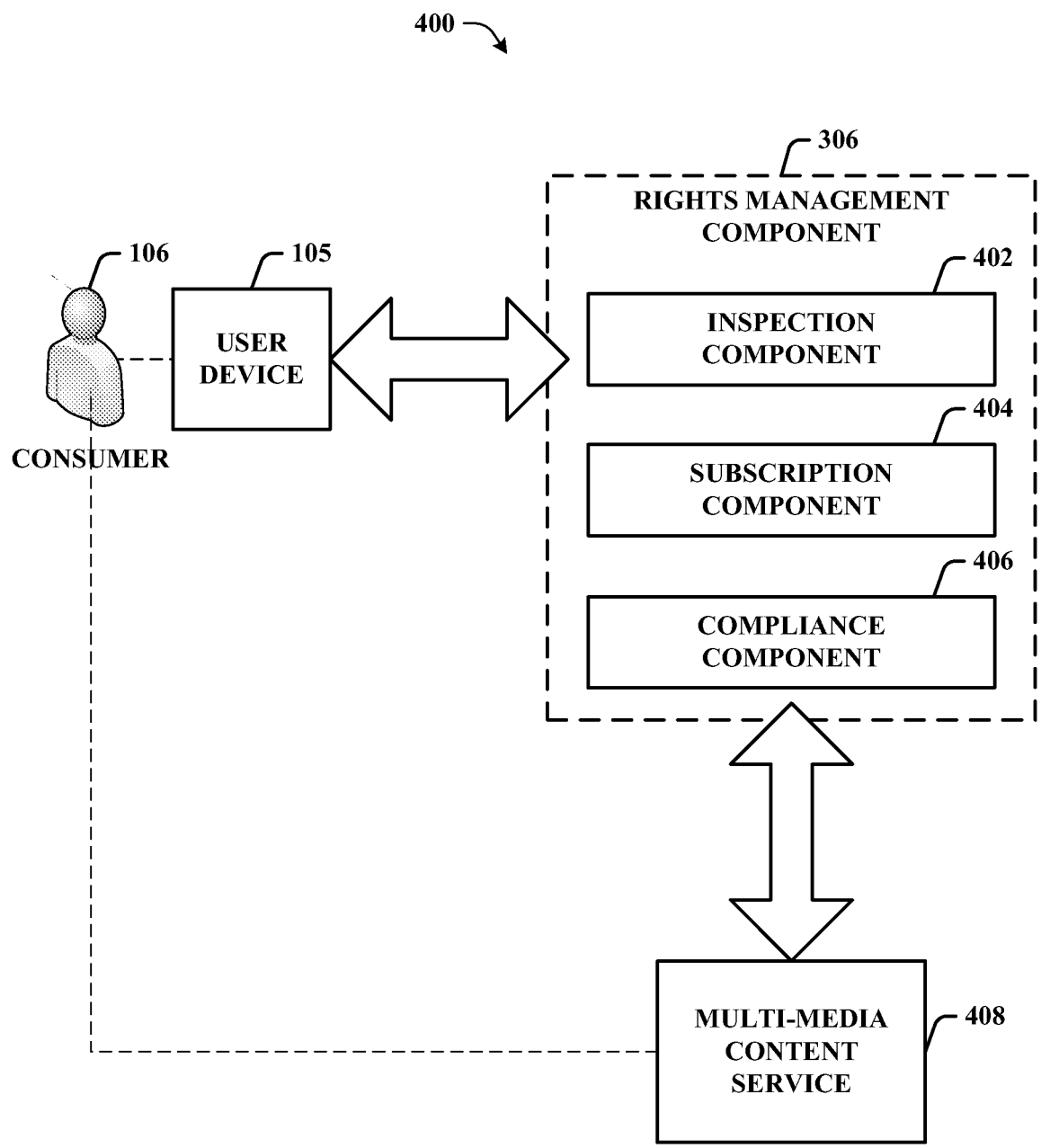
FIG. 4 illustrates an example rights management component in accordance with various aspects described in this disclosure.

Referring now to FIG. 4, illustrated is an example rights management component 306 in accordance with various aspects described in this disclosure. As discussed, the rights management component 306 determines whether the consumer 106 has authorization to consume respective media content associated with a user-generated mediaset. For example, in one implementation, the rights management component 306 determines a set of authorizations of the consumer 106 for respective media content associated with the set of user-generated mediasets 114, and takes a set of actions based on the set of authorizations of the consumer 106. The rights management component in FIG. 4 includes an inspection component 402, a subscription component 404, and a compliance component 406. The inspection component 402 examines, analyzes, or otherwise inspects authorizations associated with respective media content maintained in a user device 105. For example, in one implementation, one or more user-generated mediasets included in the set of mediasets 114 can be downloaded to the user device 105, and media content maintained on the user device 105 can be associated with the mediasets. For instance, the consumer 106 can download a user-generated exercise songs playlist from the media component 102, and locally consume songs maintained on the user device 105 by executing (e.g., playing) the user-generated exercise songs playlist. The inspection component 402 determines whether the consumer 106 has authorization to consume the respective songs associated with the user-generated exercise songs playlist. The user device can then play those songs in the playlist that the consumer has authorization to consume, e.g., are already in the consumer's personal media library.

The subscription component 404 determines a set of authorizations for the consumer 106 based on a set of subscriptions of the consumer 106. For example, in one implementation, the consumer 106 may subscribe to a multimedia content service 408 that provides authorizations for the consumer 106 to download and/or consume media content on a subscription basis. The subscription component 404 inspects subscriptions to the multimedia content service 408 associated with the consumer 106, and determines or acquires authorizations based on the subscriptions. It is to be appreciated that the rights management component 306 can employ the inspection component 402 and/or subscription component 404 alone or in combination to determine whether the consumer 106 has authorization to consume respective media content associated with a user-generated mediaset.

The compliance component 406 takes a set of actions based on the authorizations of the consumer 106 with regard to respective media content associated with a user-generated mediaset. The set of actions includes but is not limited to not recommending a mediaset to the consumer 106, restricting access to a mediaset, modifying a mediaset based on the set of authorizations, providing for the consumer 106 to purchase media content associated with a mediaset, and/or providing a notification to the consumer 106 based on the authorizations. For example, in one implementation, the compliance component 406 prohibits downloading mediasets that the consumer 106 does not have authorization to consume media content associated with the mediasets. As an additional or alternative example, in one implementation, the compliance component 406 removes associations for content from the mediaset that the user does not have authorization to consume.

Figure 5:
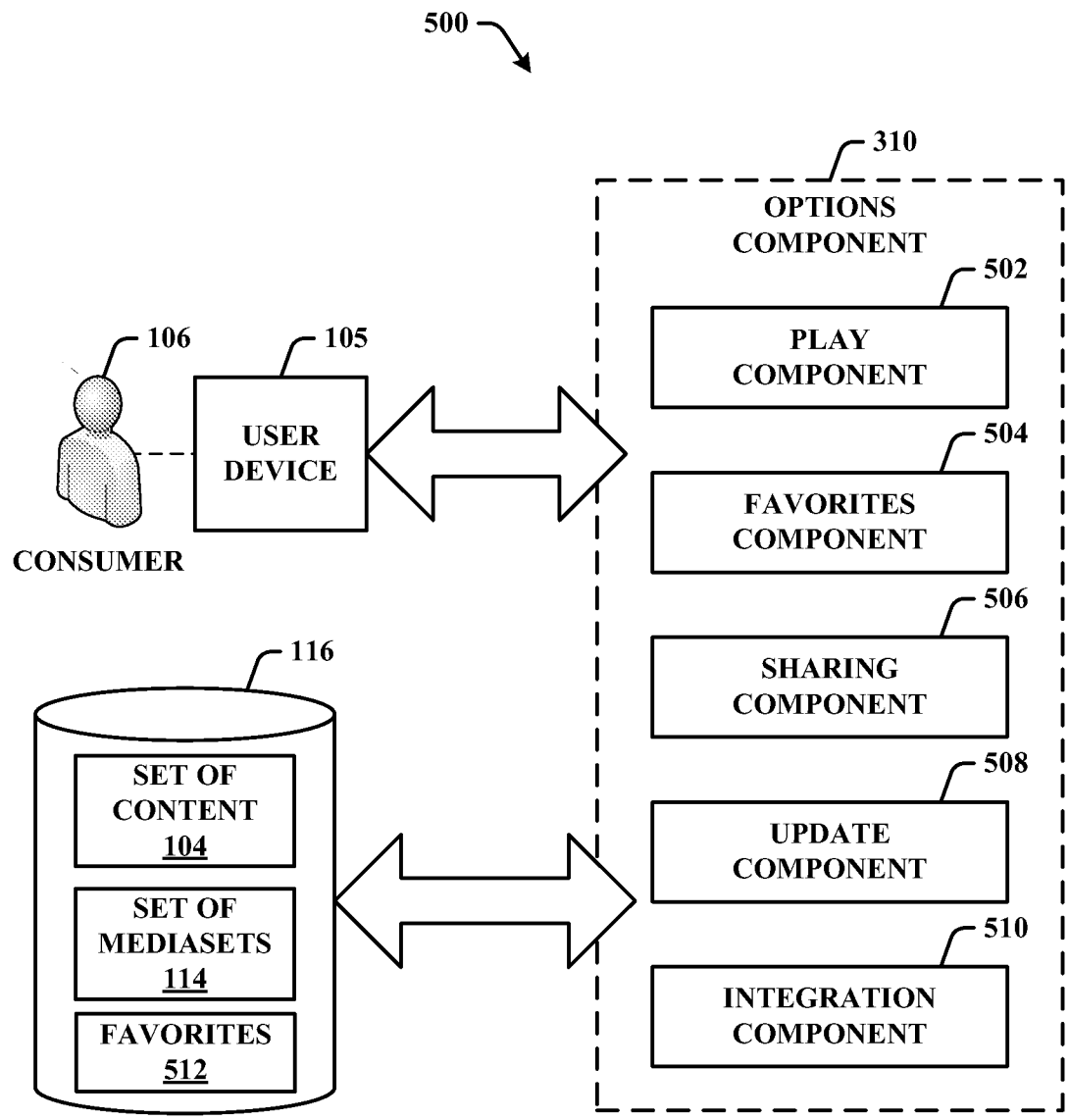
FIG. 5 illustrates an example options component in accordance with various aspects described in this disclosure.

Turning now to FIG. 5, illustrated is an example options component 310 in accordance with various aspects described in this disclosure. As discussed, the options component 310 provides a set of options for a consumer 106 regarding respective mediasets included in a set of user-generated mediasets 114 presented via a display (recommended mediasets or displayed mediasets). The options component 310 in FIG. 5 includes a play component 502, a favorites component 504, a sharing component 506, an update component 508, and an integration component 510. The play component 502 provides for the consumer 106 to execute, consume, or otherwise play a subset of the recommended mediasets. For example, the set of recommended mediasets can include a set of video playlists, and the consumer 106 can watch or view one or more of the video playlists using the play component 502.

The favorites component 504 provides for the consumer 106 to save, store, or otherwise add to a list of favorites a mediaset included in the recommended mediasets. For example, in one implementation, the favorites component 504 updates a set of favorites 512 associated with the user that is maintained in the data store 116.

The sharing component 506 provides for the consumer 106 to send to, or share with a set of other users (e.g., friends, circles, social networking contacts, etc.), a mediaset included in the recommended mediasets. For example, in one implementation, the sharing component 506 provides for the consumer 106 to designate a set of social networking contacts with whom to share a recommended mediaset. In one implementation, the sharing component 506 provides for the consumer 106 to connect to a social networking site to share a mediaset, or an identifier for the mediaset (e.g., a link), on the social networking site.

The update component 508 provides for the consumer 106 to modify, adjust, or otherwise update a recommended mediaset, and/or tags associated with respective media content associated with the recommended mediaset. For example, the consumer 106 may enjoy a first set of media content associated with a recommended mediaset, but may not enjoy a second set of media content associated with the recommended mediaset. In one implementation, the update component 508 provides for the consumer 106 to delete, erase, or otherwise remove or recommend removal of associations for the second set of media content from the recommended mediaset. As an additional or alternative example, in one implementation, the update component 508 provides for the consumer 106 to add, append, or attach associations for an additional set of media content to the recommended mediaset. Updated mediasets are included in the set of user-generated mediasets 114. For example, in one implementation, an updated mediaset is included in the set of mediasets 114 as a new mediaset or an updated mediaset, and a tag is appended to the mediaset that references the original mediaset. For instance, the consumer 106 can update a user-generated exercise songs playlist, and the updated playlist can be included in the set of mediasets 114, and a tag can be appended to the updated playlist that indicates the consumer 106 updated the user-generated exercise songs playlist.

The integration component 510 provides various adapters, connectors, channels, communication paths, etc. to integrate the options component 310 into virtually any operating and/or database system(s). In addition, the integration component 510 can provide various adapters, connectors, channels, communication paths, etc., that provide for interaction with the options component 310. It is to be appreciated that although the integration component 510 is illustrated as incorporated into the options component 310 such implementation is not so limited. For instance, the integration component 510 can be a stand-alone component, or can be included in the user device 105.

Figure 6:
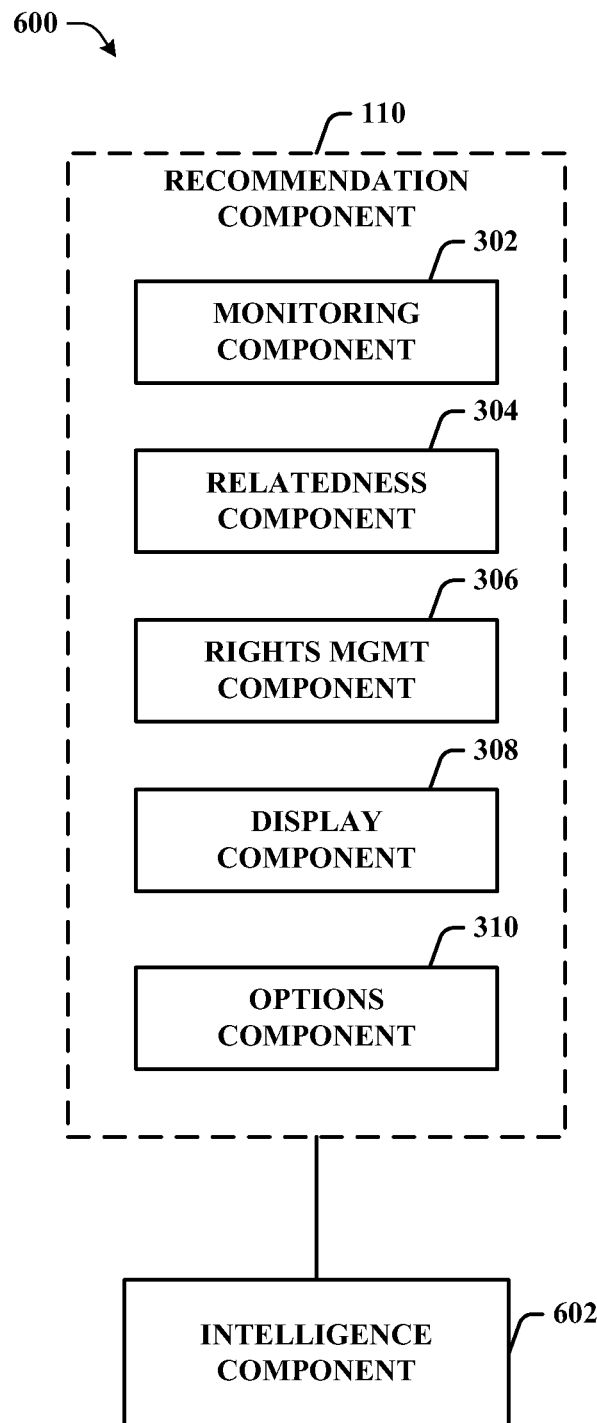
FIG. 6 illustrates an example system for adaptive recommendations of user-generated mediasets in accordance with various aspects described in this disclosure.

FIG. 6 illustrates an example system 600 that employs an intelligence component 602 that facilitates inferring and/or recommending user-generated mediasets in accordance with various aspects described in this disclosure. For example, all or portions of monitoring component 302, relatedness component 304, rights management component 306, display component 308, and/or options component 310 are operatively coupled to intelligence component 602. Additionally or alternatively, all or portions of intelligence component 602 may be included in one or more components described in this disclosure. As discussed, the relatedness component 304 determines a subset of user-generated mediasets 114 that are related to media consumed by a user based on a set of relatedness criteria.

The intelligence component 602 facilitates inferring relatedness of consumed media content or mediasets and respective mediasets in the set of user-generated mediasets 114. Additionally or alternatively, the intelligence component 602 infers a subset of relatedness criteria employed in determining relatedness. For example, the intelligence component 602 can determine user behavior between a consumed mediaset and mediasets included in the set of user-generated mediasets 114, and infer or determine a relatedness based in part on the user behavior.

Accordingly, in order to provide for or aid in the numerous inferences described in this disclosure, intelligence component 602 examines the entirety or a subset of the data available and provides for reasoning about or infer states of the system, environment, client, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is used to develop models of priority.

Non-Limiting Examples of Methods for Dynamic Mediaset Recommendation

Figure 7:
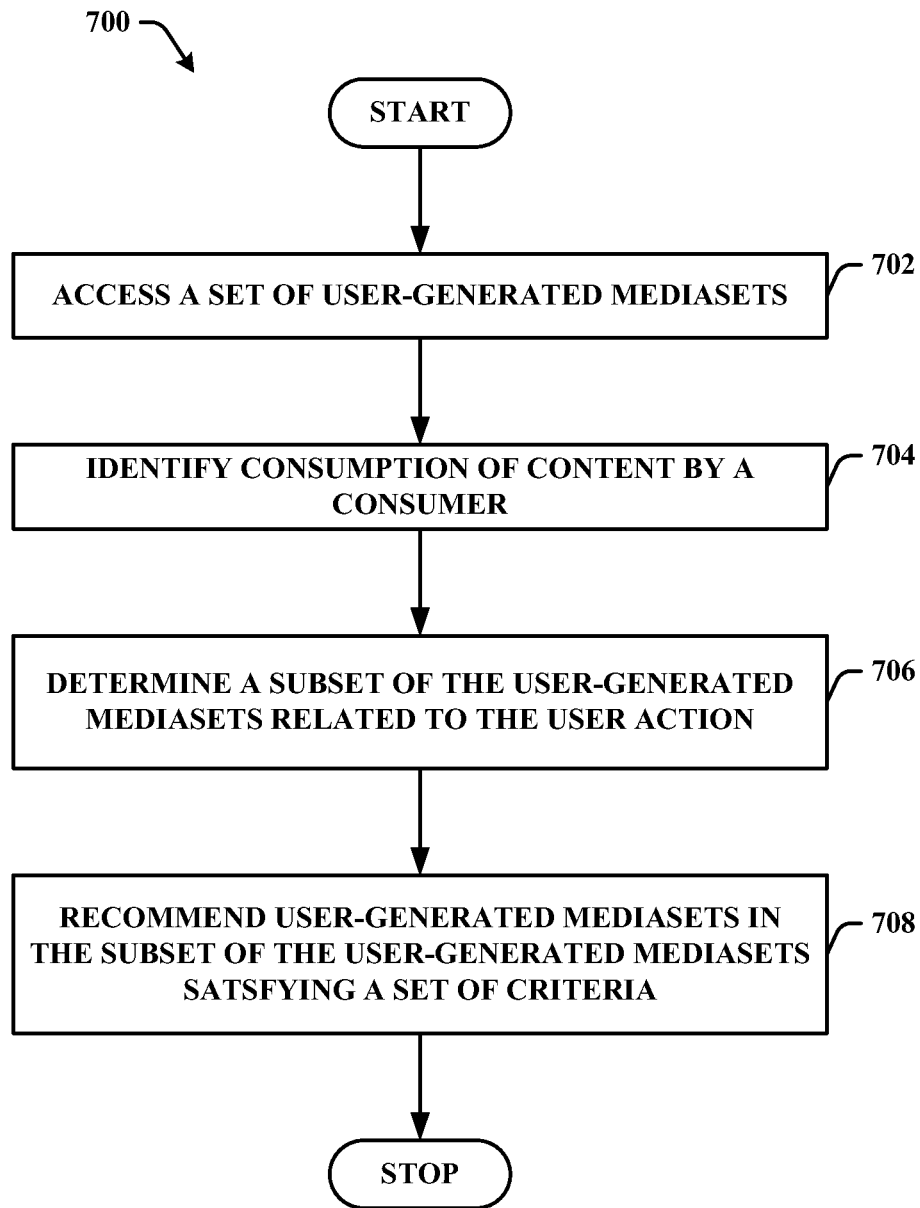
FIGS. 7-9 are example flow diagrams of respective methodologies for adaptive recommendations of user-generated mediasets in accordance with various aspects described herein.
Figure 8:
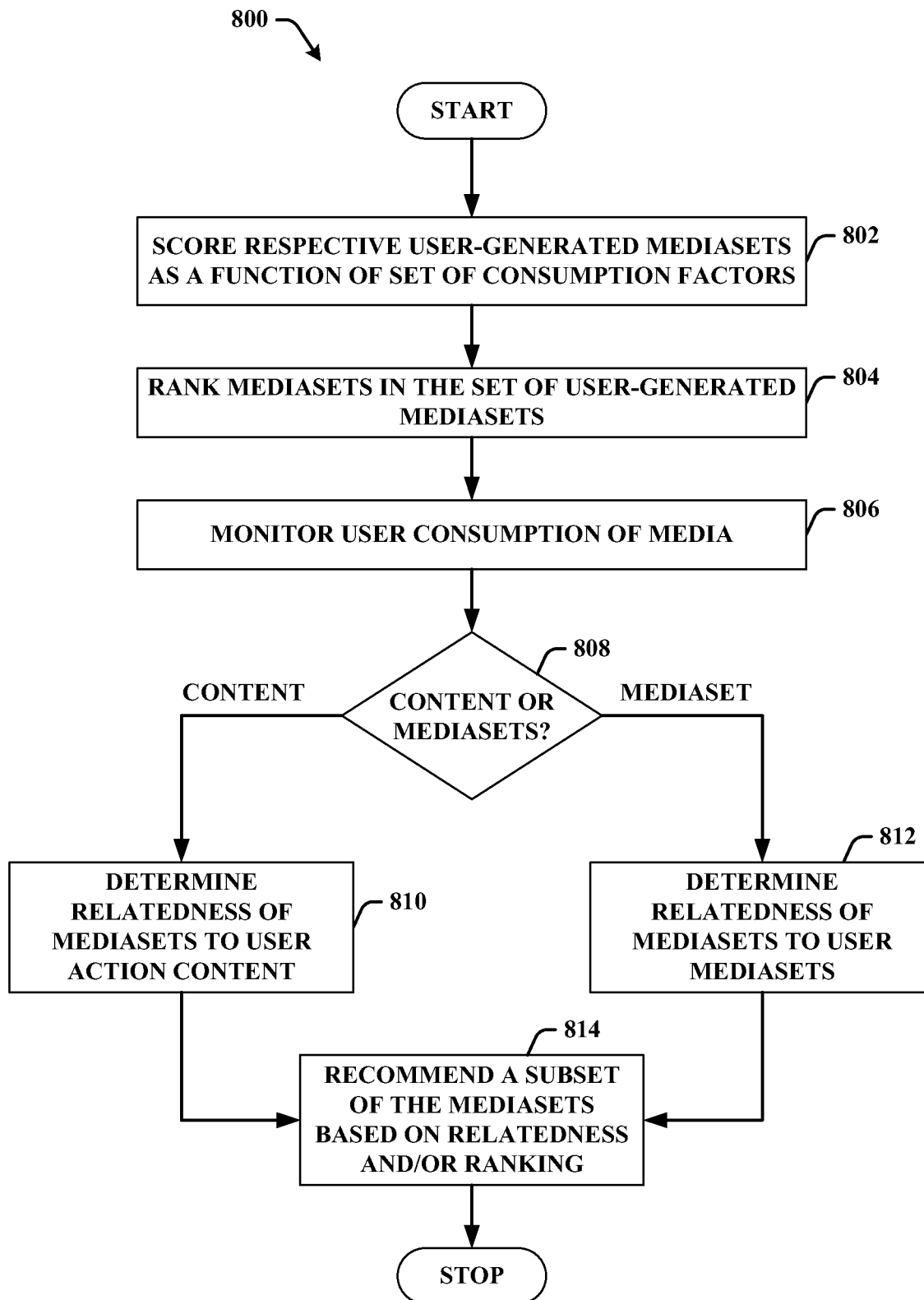
Figure 9:
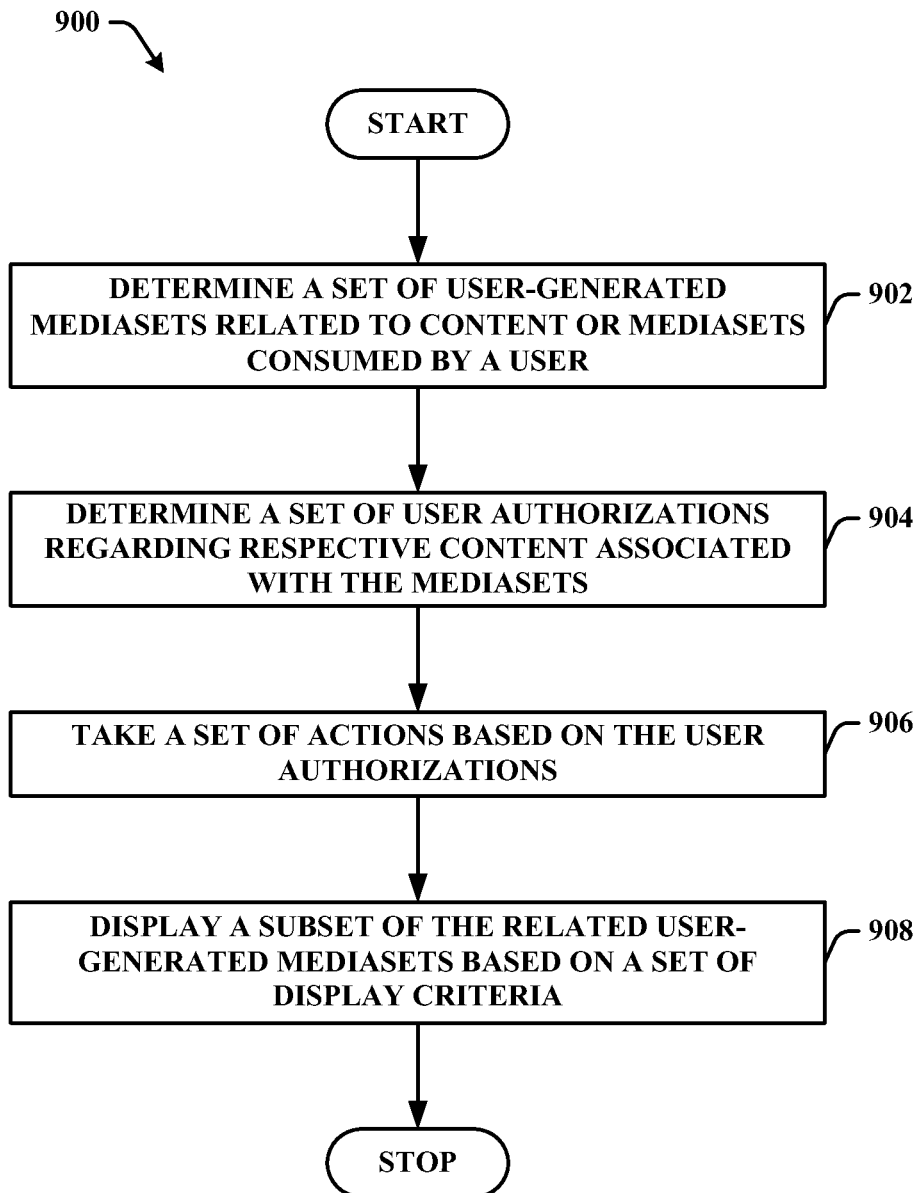

FIGS. 7-9 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 7, illustrated is an example methodology 700 for adaptive recommendations of user-generated mediasets in accordance with various aspects in this disclosure. At reference numeral 702, a set of user-generated mediasets are accessed (e.g., using the media component 102). The user-generated mediasets can include but are not limited to user-generated playlists and/or user-generated channels. A set of media content is associated with a user-generated mediaset. The set of media content can include but is not limited to videos, music, electronic books (e-books), video games, websites, and/or articles. For example, in one implementation, a user uploads media content to associate with a user-generated video channel, and determines a set of channel options for the user-generated channel (e.g., using the mediaset component 108). The channel options can include but are not limited to an order (e.g., rank, sequence, etc.) of the respective media content associated with the user-generated channel, a set of privacy options for the user-generated channel (e.g., public, private, only-friends, etc.), and/or a set of tags (e.g., metadata, notes, ratings, reviews, etc.) associated with the user-generated channel.

At reference numeral 704, consumption of content by a consumer is identified (e.g., using the monitoring component 302). Consumption can include but is not limited to viewing, searching, downloading, sharing, rating, and/or reviewing content or mediasets. For example, the consumer can search a set of media content for "kung fu movies." In one implementation, users/consumers are notified of the types of information that are stored, transmitted, monitored and/or shared, and the users/consumers are provided opportunities to opt-out of having such information stored, transmitted, monitored and/or shared (e.g., using the monitoring component 302).

At reference numeral 706, a subset of the user-generated mediasets related to the consumed content are determined (e.g., using the relatedness component 304). For example, where the consumer searches the set of media content for "kung fu movies," a subset of the user-generated mediasets that are related to "kung fu movies" are determined. At reference numeral 708, user-generated mediasets included in the subset of user-generated mediasets satisfying a set of criteria are recommended to the consumer (e.g., using the recommendation component 110). The criteria can include but is not satisfying a predetermined relatedness threshold, satisfying a predetermined relatedness ranking threshold (e.g., top 5, top 10, etc.), satisfying a score threshold, and/or satisfying a score ranking threshold.

FIG. 8 illustrates an example methodology 800 for adaptive recommendations of user-generated mediasets in accordance with various aspects in this disclosure. At reference numeral 802, respective user-generated mediasets are scored as a function of a set of consumption factors (e.g., using the scoring component 206). The user-generated mediasets can include but are not limited to user-generated playlists and/or user-generated channels. A set of media content is associated with a user-generated mediaset. The set of media content can include but is not limited to videos, music, electronic books (e-books), video games, websites, and/or articles. The consumption factors can include but are not limited to user ratings, a quantity or percentage of users that save or add the user-generated mediaset to a favorites list, a quantity or percentage of users that share (e.g., post, status, blog, etc.) the user-generated mediaset, a category or classification of the user-generated mediaset, and/or a quantity or percentage of users that consume the user-generated mediaset.

At reference numeral 804, the user-generated mediasets are ranked as a function of the respective scores (e.g., using the ranking component 208). For example, a first user-generated mediaset can be ranked higher than other user-generated mediasets having scores that are less than the score of the first user-generated mediaset. At reference numeral 806, consumption of media is monitored (e.g., using the monitoring component 302). Consumption can include but is not limited to viewing, searching, downloading, sharing, rating, and/or reviewing content or mediasets. For example, the user can search a set of media content for "MotoGP races," and monitoring component can recognize that the search was performed. In one implementation, users are notified of the types of information that are stored, transmitted, monitored and/or shared, and provides the users opportunities to opt-out of having such information stored, transmitted, monitored and/or shared (e.g., using the monitoring component 302).

At reference numeral 808, a determination is made whether the consumption is of media content or a mediaset. At reference numeral 810, if it is determined that the consumption is of media content (content at reference numeral 808), then a relatedness of respective user-generated mediasets included in the set of user-generated mediasets and the consumed media content is determined. For example, in one implementation, the relatedness of a user-generated mediaset (S) included in the set of user-generated mediasets and the consumed media content (V) is determined as a function of the relatedness of respective content (SV1, SV2, . . . , SVx) associated with the user-generated mediaset (S) and the consumed media content (V) (e.g., Relatedness (V, S)=Sum(Relatedness(V, SV1)+Relatedness (V, SV2), + . . . +Relatedness(V, SVx), where X is an integer) (e.g., using the relatedness component 304).

At reference numeral 812, if it is determined that the user consumption is of a mediaset (mediaset at reference numeral 808), then a relatedness of respective user-generated mediasets included in the set of user-generated mediasets and the consumed mediaset is determined. For example, in one implementation, the relatedness of a first user-generated mediaset (S1) included in the set of user-generated mediasets and the consumed mediaset (S2) is determined as a function of the relatedness of respective content included in the first mediaset (S1V1, S1V2, . . . , S1Vx, where X is an integer) and respective content (S2V1, S2V2, . . . , S2Vy, where Y is an integer) included in the consumed mediaset (e.g., using the relatedness component 304). As an additional or alternative example, in one implementation, the relatedness of the first mediaset (S1) and the consumed mediaset (S2) is determined as a function of user behavior between the mediasets. User behavior between the mediasets can include but is not limited to consuming content (e.g., using the relatedness component 304). For instance, the relatedness of the first user-generated mediaset (S1) and the consumed mediaset (S2) can be determined as a function of common attributes or user ratings provided for respective content common to both the first mediaset (S1) and consumed mediaset (S2).

At reference numeral 814, a subset of mediasets included in the set of user-generated mediasets are recommended to the consumer user based in part on relatedness and/or rankings of the respective mediasets (e.g., using the recommendation component 110). For example, in one implementation, mediasets having a relatedness that satisfies a predetermined relatedness threshold, and/or a predetermined ranking based on relatedness threshold are recommended to the user.

Turning now to FIG. 9, illustrated is an example methodology 900 for adaptive recommendations of user-generated mediasets in accordance with various aspects in this disclosure. At reference numeral 902, a set of user-generated mediasets related to content or mediasets consumed by a user are determined (e.g., using the relatedness component 304). Consumption can include but is not limited to viewing, searching, downloading, sharing, rating, and/or reviewing content or mediasets. For example, in one implementation, the set of user-generated mediasets related to content or mediasets consumed by a user is determined based on a set of relatedness criteria. The relatedness criteria can include but are not limited to having a relatedness above a predetermined threshold, and/or having a ranking based on relatedness above a predetermined threshold (e.g., top 5, top 10, etc.).

At reference numeral 904, a set of authorizations for the user (user authorizations) regarding respective media content associated with the related user-generated mediasets is determined (e.g., using the rights management component 306). For example, in one implementation, authorizations for respective media content maintained in a user device are inspected (e.g., using the inspection component 402). As an additional or alternative example, in one implementation, user authorizations are determined based on a set of subscriptions of the user (e.g., using the subscription component 404). For instance, the user may subscribe to a multimedia content service that provides a set of authorizations for the user to download and/or consume media content on a subscription basis.

At reference numeral 906, a set of actions is taken based in part on the set of user authorizations (e.g., using the compliance component 406). The set of actions can include but is not limited to not recommending a mediaset to the user, restricting access to a mediaset, modifying a mediaset based on the set of authorizations, providing for the user to purchase media content associated with a mediaset, and/or notifying the user of unavailable content and/or authorizations. For instance, downloading of mediasets associated with media content that the user does not have authorization to consume can be restricted or prohibited. As an additional or alternative example, associations with media content that the user does not have authorization to consume can be removed from a mediaset.

At reference numeral 908, a subset of the related user-generated mediasets is provided to the user, e.g., via a display based in part on a set of display criteria. Aspects of the invention are not limited to a particular display of the subset of the mediasets, and can include a media channel, a list, a leaderboard, a chart, a graph, and/or a map. The display criteria can include but is not limited to satisfying a relatedness threshold, satisfying a relatedness ranking threshold, the set of actions taken (at reference numeral 906), and/or the user having authorizations to consume respective media content associated with a mediaset.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 10:
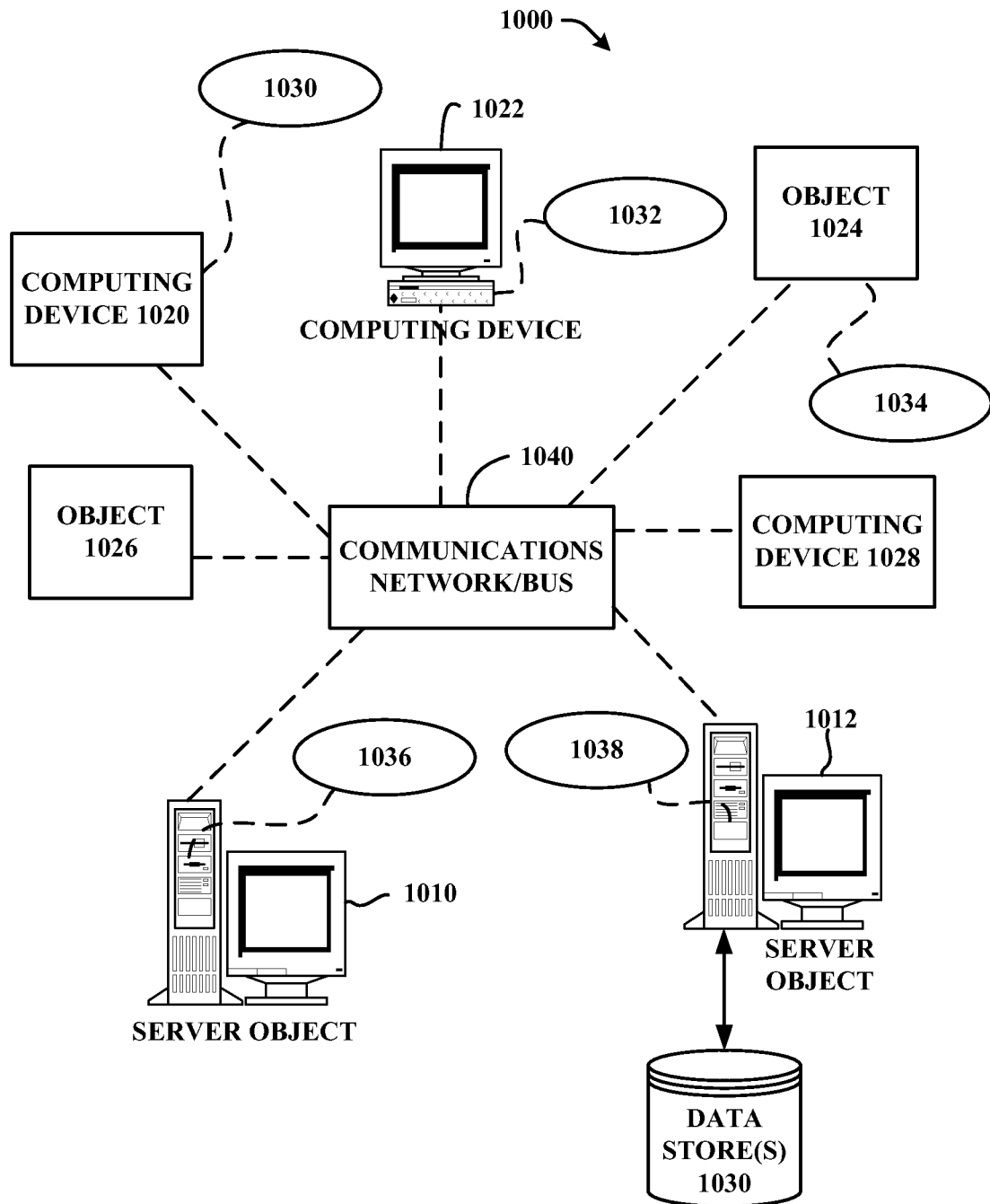
FIG. 10 is a block diagram representing an exemplary non-limiting networked environment in which the various embodiments can be implemented.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be appreciated that computing objects 1010, 1012, etc. and computing objects or devices 1020, 1022, 1024, 1026, 1028, etc. may comprise different devices, such as personal data assistants (PDAs), audio/video devices, mobile phones, MP3 players, personal computers, tablets, laptops, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1040, either directly or indirectly. Even though illustrated as a single element in FIG. 10, network 1040 may comprise other computing objects and computing devices that provide services to the system of FIG. 10, and/or may represent multiple interconnected networks, which are not shown. Each computing object 1010, 1012, etc. or computing objects or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc. provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 1040 is the Internet, for example, the computing objects 1010, 1012, etc. can be Web servers with which the client computing objects or devices 1020, 1022, 1024, 1026, 1028, etc. communicate via any of a number of known protocols, such as the hypertext transfer protocol (HTTP). Objects 1010, 1012, etc. may also serve as client computing objects or devices 1020, 1022, 1024, 1026, 1028, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 11 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 11:
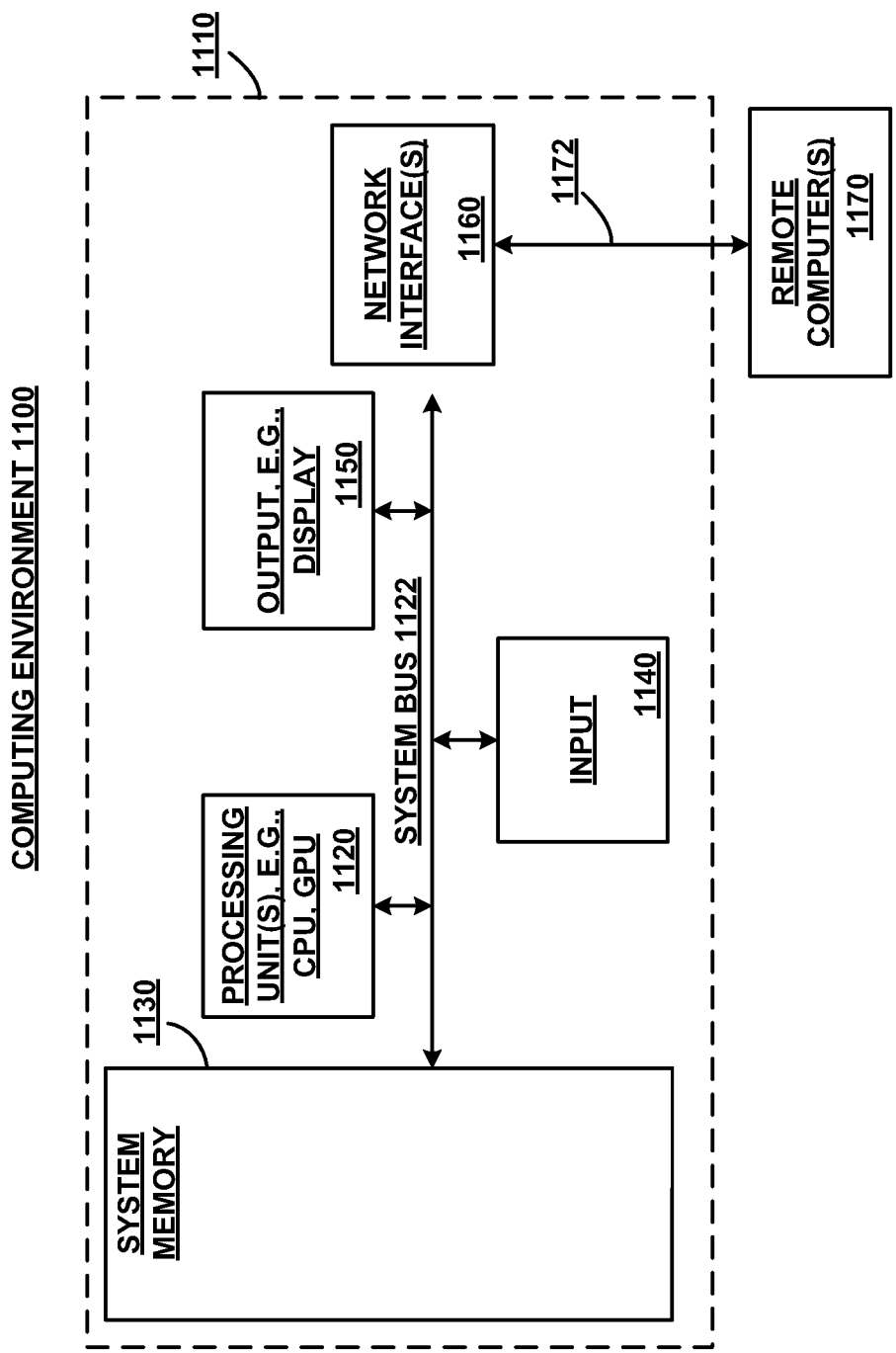
FIG. 11 is a block diagram representing an exemplary non-limiting computing system or operating environment in which the various embodiments may be implemented.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. Neither is the computing environment 1100 be interpreted as having any dependency or requirement relating to any one or combination of components illustrated in the exemplary operating environment 1100.

With reference to FIG. 11, an exemplary remote device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, memory 1130 may also include an operating system, application programs, other program modules, and program data.

A user can enter commands and information into the computer 1110 through input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method for identifying user-generated media, the method comprising:
   determining that at least one media content item from a first user-generated playlist of media content items of a plurality of user-generated playlists of media content items is being viewed by a first entity;
   in response to determining that the at least one media content item is being viewed by the first entity, determining a plurality of relatedness values between the first user-generated playlist of media content items and each of the plurality of user-generated playlists of media content items, wherein each of the plurality of relatedness values indicates a relatedness of each of the user-generated playlists of the plurality of user-generated playlists to the at least one media content item being viewed, and wherein the relatedness value of each of the user-generated playlists of the plurality of user-generated playlists is inferred based on user behavior information that indicates viewings of media content items included in the user-generated playlist of media content items and the at least one media content item being viewed across a plurality of users;
   identifying an authorization of the first entity to view media content included in the plurality of user-generated playlists of media content items;
   determining, based on the authorization that playback of the media content included in the plurality of user-generated playlists by the first entity in a first playback manner is authorized and that playback of the media content included in the plurality of user-generated playlists by the first entity in a second playback manner is prohibited; and
   recommending a subset of the plurality of user-generated playlists of media content items to the first entity based on a ranking of the plurality of relatedness values, wherein the recommendations are presented with a group of actions available to the first entity relating to the subset of the plurality of user-generated playlists of media content items, and wherein the group of actions are selected based on the first playback manner and the second playback manner.

2. The method of claim 1, wherein the user behavior information includes a review of a media content item.

3. The method of claim 1, wherein the subset of the plurality of user-generated playlists of media content items are selected based on each of the subset of the plurality of user-generated playlists of media content items satisfying authorization criteria.

4. The method of claim 1, further comprising:
   receiving, from the first entity, an indication that the first user-generated playlist of media content items is to be modified based on the subset of the plurality of user-generated playlists of media content items, wherein an action of the group of actions is modifying the first user-generated playlist of media content items; and
   in response to receiving the indication, modifying the first user-generated playlist of media content items.

5. A system for identifying user-generated media, the system comprising:
   a hardware processor that is programmed to:
      determine that at least one media content item from a first user-generated playlist of media content items of a plurality of user-generated playlists of media content items is being viewed by a first entity;
      in response to determining that the at least one media content item is being viewed by the first entity, determine a plurality of relatedness values between the first user-generated playlist of media content items and each of the plurality of user-generated playlists of media content items, wherein each of the plurality of relatedness values indicates a relatedness of each of the user-generated playlists of the plurality of user-generated playlists to the at least one media content item being viewed, and wherein the relatedness value of each of the user-generated playlists of the plurality of user-generated playlists is inferred based on user behavior information that indicates viewings of media content items included in the user-generated playlist of media content items and the at least one media content item being viewed across a plurality of users;

identify an authorization of the first entity to view media content included in the plurality of user-generated playlists of media content items;

determine, based on the authorization that playback of the media content included in the plurality of user-generated playlists by the first entity in a first playback manner is authorized and that playback of the media content included in the plurality of user-generated playlists by the first entity in a second playback manner is prohibited; and recommend a subset of the plurality of user-generated playlists of media content items to the first entity based on a ranking of the plurality of relatedness values, wherein the recommendations are presented with a group of actions available to the first entity relating to the subset of the plurality of user-generated playlists of media content items, and wherein the group of actions are selected based on the first playback manner and the second playback manner.

6. The system of claim 5, wherein the user behavior information includes a review of a media content item.

7. The system of claim 5, wherein the subset of the plurality of user-generated playlists of media content items are selected based on each of the subset of the plurality of user-generated playlists of media content items satisfying authorization criteria.

8. The system of claim 5, wherein the hardware processor is further programmed to:

receive, from the first entity, an indication that the first user-generated playlist of media content items is to be modified based on the subset of the plurality of user-generated playlists of media content items, wherein an action of the group of actions is modifying the first user-generated playlist of media content items; and in response to receiving the indication, modify the first user-generated playlist of media content items.

9. A non-transitory computer-readable medium, comprising computer-executable instructions that, when executed on a computing device, perform a method for identifying user-generated media, the method comprising:

determining that at least one media content item from a first user-generated playlist of media content items of a plurality of user-generated playlists of media content items is being viewed by a first entity;

in response to determining that the at least one media content item is being viewed by the first entity, determining a plurality of relatedness values between the first user-generated playlist of media content items and each of the plurality of user-generated playlists of media content items, wherein each of the plurality of relatedness values indicates a relatedness of each of the user-generated playlists of the plurality of user-generated playlists to the at least one media content item being viewed, and wherein the relatedness value of each of the user-generated playlists of the plurality of user-generated playlists is inferred based on user behavior information that indicates viewings of media content items included in the user-generated playlist of media content items and the at least one media content item being viewed across a plurality of users;

identifying an authorization of the first entity to view media content included in the plurality of user-generated playlists of media content items;

determining, based on the authorization that playback of the media content included in the plurality of user-generated playlists by the first entity in a first playback manner is authorized and that playback of the media content included in the plurality of user-generated playlists by the first entity in a second playback manner is prohibited; and recommending a subset of the plurality of user-generated playlists of media content items to the first entity based on a ranking of the plurality of relatedness values, wherein the recommendations are presented with a group of actions available to the first entity relating to the subset of the plurality of user-generated playlists of media content items, and wherein the group of actions are selected based on the first playback manner and the second playback manner.

10. The non-transitory computer-readable medium of claim 9, wherein the user behavior information includes a review of a media content item.

11. The non-transitory computer-readable medium of claim 9, wherein the subset of the plurality of user-generated playlists of media content items are selected based on each of the subset of the plurality of user-generated playlists of media content items satisfying authorization criteria.

12. The non-transitory computer-readable medium of claim 9, wherein the method further comprises:

receiving, from the first entity, an indication that the first user-generated playlist of media content items is to be modified based on the subset of the plurality of user-generated playlists of media content items, wherein an action of the group of actions is modifying the first user-generated playlist of media content items; and in response to receiving the indication, modifying the first user-generated playlist of media content items.

\* \* \* \* \*